US009016992B2

(12) United States Patent
Alvarado, Jr.

(10) Patent No.: US 9,016,992 B2
(45) Date of Patent: Apr. 28, 2015

(54) BUSHING ASSEMBLIES, BUSHING ASSEMBLY KITS, APPARATUSES INCLUDING BUSHING ASSEMBLIES, AND ASSOCIATED METHODS

(71) Applicant: The Boeing Company, Seal Beach, CA (US)

(72) Inventor: Santiago Alvarado, Jr., Seattle, WA (US)

(73) Assignee: The Boeing Company, Chicago, IL (US)

( * ) Notice: Subject to any disclaimer, the term of this patent is extended or adjusted under 35 U.S.C. 154(b) by 258 days.

(21) Appl. No.: 13/676,443

(22) Filed: Nov. 14, 2012

(65) Prior Publication Data

US 2014/0130910 A1    May 15, 2014

(51) Int. Cl.
| | |
|---|---|
| *F16B 13/04* | (2006.01) |
| *H01B 5/06* | (2006.01) |
| *F16B 4/00* | (2006.01) |
| *F16B 1/00* | (2006.01) |

(52) U.S. Cl.
CPC . *H01B 5/06* (2013.01); *Y10T 16/05* (2015.01); *Y10T 29/49947* (2015.01); *F16B 4/004* (2013.01); *F16B 2001/0064* (2013.01)

(58) Field of Classification Search
USPC ............. 411/34, 37, 38, 69, 337, 383; 16/2.1
See application file for complete search history.

(56) References Cited

U.S. PATENT DOCUMENTS

| | | | | | |
|---|---|---|---|---|---|
| 1,365,719 | A | * | 1/1921 | Ogden | 411/34 |
| 2,257,538 | A | * | 9/1941 | Schlueter | 411/34 |
| 2,430,737 | A | * | 11/1947 | Roe | 16/39 |
| 2,520,375 | A | * | 8/1950 | Roe | 16/39 |
| 2,653,334 | A | * | 9/1953 | Bay | 15/104.14 |
| 3,031,212 | A | | 4/1962 | Oliver | |
| 4,289,060 | A | * | 9/1981 | Emmett | 411/34 |
| 4,789,285 | A | * | 12/1988 | Fischer | 411/32 |
| 5,653,615 | A | | 8/1997 | Inaba et al. | |
| 5,683,215 | A | * | 11/1997 | Gaignard et al. | 411/34 |
| 6,273,655 | B1 | * | 8/2001 | McAlpine et al. | 411/34 |
| 6,629,808 | B1 | * | 10/2003 | Martin et al. | 411/24 |
| 6,905,295 | B2 | * | 6/2005 | Stevenson et al. | 411/34 |
| 2007/0147971 | A1 | * | 6/2007 | Jennings et al. | 411/38 |
| 2012/0152611 | A1 | | 6/2012 | Fisher et al. | |

* cited by examiner

*Primary Examiner* — Roberta Delisle
(74) *Attorney, Agent, or Firm* — DASCENZO Intellectual Property Law, P.C.

(57) ABSTRACT

Bushing assemblies include a first tubular end portion, a second tubular end portion, and a middle tubular portion. The middle tubular portion has a longitudinal compressive strength that is less than that of the end portions. In some embodiments, the middle tubular portion is constructed of braided sleeving. Also disclosed are bushing assembly kits, apparatuses that include bushing assemblies, such as aircraft, and associated methods of utilizing bushing assemblies.

20 Claims, 4 Drawing Sheets

BUSHING ASSEMBLIES, BUSHING ASSEMBLY KITS, APPARATUSES INCLUDING BUSHING ASSEMBLIES, AND ASSOCIATED METHODS

FIELD

The present disclosure relates generally to bushings and more specifically to electrically conductive bushings.

BACKGROUND

Bushings are used for a variety of purposes, and typically, a bushing is a hollow cylindrical component, such as a tube or sleeve, that may be used as a guide or spacer for various tools, fasteners, parts, etc. In some applications, a bushing may form a portion of a bearing assembly.

In the aerospace industry, one application for bushings includes ensuring that components that extend through the wall of a fuel tank are sufficiently grounded electrically to the wall of the fuel tank, so as to avoid sparking. In modern aircraft construction, in which airframes, including fuel tanks, are constructed of carbon fiber reinforced polymers, and when utilizing existing bushing technology, the holes that extend through the wall of a fuel tank and the bushings themselves that are press fit into the holes are required to have very tight tolerances with respect to each other to ensure proper engagement between, and thus grounding of, the bushings and the wall of the fuel tank. The manufacturing costs associated these tolerances are not insignificant.

SUMMARY

Bushing assemblies, bushing assembly kits, apparatuses that include bushing assemblies, and associated methods are disclosed herein. Bushing assemblies according to the present disclosure are configured to be used in the mounting of a component to an object, such as by utilizing a fastener to operatively mount the component to an object. As an illustrative, non-exclusive example, a bushing assembly may be used to operatively mount a hydraulic line to a fuel tank of an aircraft; however, other applications of bushing assemblies also are within the scope of the present disclosure.

Some bushing assemblies according to the present disclosure include a first tubular end portion, a second tubular end portion, and a middle tubular portion. The middle tubular portion has a longitudinal compressive strength that is less than that of the end portions, and the middle tubular portion is configured to be compressed longitudinally between the end portions when the bushing assembly is utilized to mount a component to an object.

Some bushing assemblies according to the present disclosure include a first tubular end portion, a second tubular end portion, and a middle tubular portion positioned between and engaged with the first tubular end portion and the second tubular end portion. The middle tubular portion includes a sleeve of woven strands. The first tubular end portion, the second tubular end portion, and the middle tubular portion collectively define a through-bore for receiving a fastener for mounting a component to an object.

Some bushing assembly kits according to the present disclosure include a first tubular end portion having a first longitudinal compressive strength; a second tubular end portion having a second longitudinal compressive strength; and a middle tubular portion for being positioned between and engaged with the first tubular end portion and the second tubular end portion. The middle tubular portion has a third longitudinal compressive strength that is less than the first longitudinal compressive strength and the second longitudinal compressive strength. The first tubular end portion, the second tubular end portion, and the middle tubular portion are for collectively defining a bushing assembly for receiving a fastener for mounting a component to an object. When the bushing assembly is defined and when a compressive force is applied to the middle tubular portion by the first tubular end portion and the second tubular end portion, the middle tubular portion longitudinally compresses.

Some methods according to the present disclosure may include positioning a bushing assembly according to the present disclosure in a mounting hole of an object to which a component is to be mounted; positioning the component relative to the object to which the component is to be mounted; positioning a fastener through the mounting hole and the through-bore of the bushing assembly; and fastening the component to the object.

In some applications, a bushing assembly according to the present disclosure may be used to ensure adequate grounding of a component that is mounted to an object.

The features, functions, and advantages that have been discussed can be achieved independently in various embodiments or may be combined in yet other embodiments, further details of which can be seen with reference to the following description and drawings.

DESCRIPTION

Bushing assemblies, bushing assembly kits, apparatuses that include bushing assemblies, and associated methods are disclosed herein. Bushing assemblies according to the present disclosure are configured to be used in the mounting of a component to an object, such as by utilizing a fastener to operatively mount the component to the object. Examples of components, objects, and associated apparatuses discussed herein generally relate to aircraft; however, bushing assemblies, bushing assembly kits, and associated methods according to the present disclosure may relate to any suitable apparatuses, and the present disclosure is not limited to aerospace applications.

Figure 1:
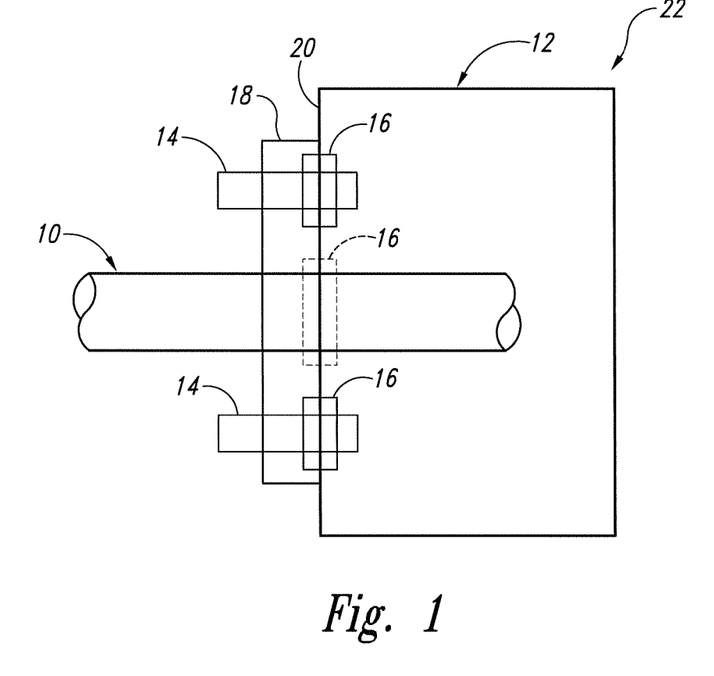
FIG. 1 is a diagram schematically representing a portion of an apparatus that includes bushing assemblies according to the present disclosure.

FIG. 1 schematically illustrates a generic component 10 mounted to a generic object 12 utilizing fasteners 14 and bushing assemblies 16. In the schematic representation of FIG. 1, component 10 includes a mounting structure 18 that is engaged with a wall 20 of the object 12 and that provides structure for fasteners 14 to operatively mount the component 10, including the mounting structure 18 thereof, to the wall 20 of the object 12. As schematically illustrated in FIG. 1, fasteners 14 extend through the wall 20, and bushing assemblies 16 provide an interface between the fasteners 14 and the wall 20 of the object 12. As schematically and optionally illustrated in dashed lines in FIG. 1, a bushing assembly 16 additionally or alternatively may be used to provide an interface between the component 10, itself, and the wall 20 of the object 12. The assembly of a component 10 and an object 12, including fasteners 14 and bushing assemblies 16, may comprise an apparatus 22, or at least a portion of an apparatus 22, as generally indicated in FIG. 1. FIG. 1 is schematic in nature and is intended solely to schematically and graphically illustrate the relative relationships between a component 10, an object 12, fasteners 14, and bushing assemblies 16 according to the present disclosure, and does not limit the present disclosure to a specific application of bushing assemblies 16 according to the present disclosure.

Bushing assemblies 16 are configured to provide a desired interface between a component 10 and/or fasteners 14 associated with the component 10, the mounting structure 18, and the wall 20 of an object 12. The desired interface may be based on any suitable criteria. As an illustrative, non-exclusive example, bushing assemblies 16 may be utilized to suitably and electrically ground the component 10 to the object 12, or otherwise ensure that the bushing assembly 16 provides an electric current flow path between the component 10 and the object 12. Such a configuration may be desirable for a number of reasons. As an illustrative, non-exclusive example, the component 10 may be configured to carry an electric charge, and it may be desirable to prevent sparking at the interface of the component 10 and the object 12 or between the associated fasteners 14 and the object 12. In such an application, bushing assemblies 16 may be utilized to ensure that the interface between the component 10, the mounting structure 18, and/or associated fasteners 14 and the object 12 is tight, or free of voids, so as to increase the conductivity and decrease the resistivity of the interface, thereby decreasing the opportunity for a spark to form at the interface. Other applications also are within the scope of the present disclosure.

Figure 2:
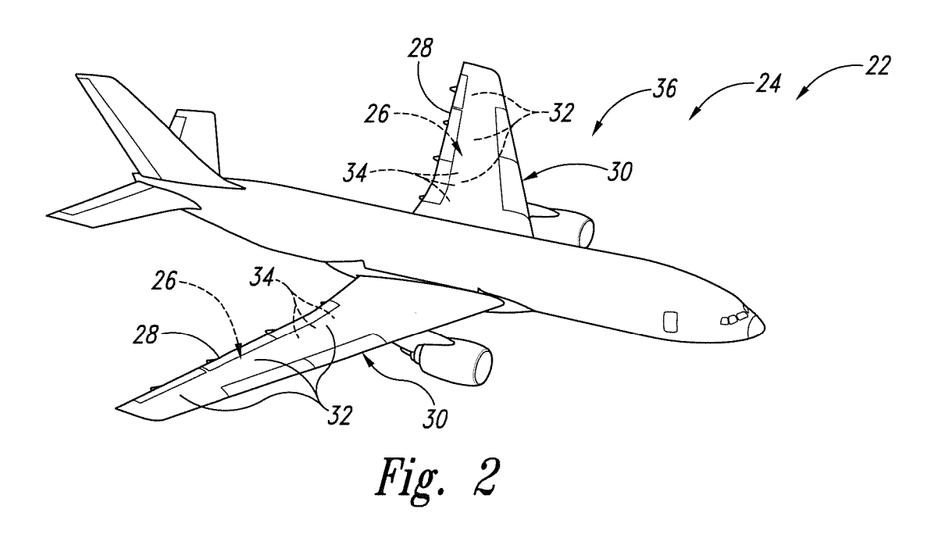
FIG. 2 is a perspective of an aircraft, representing an illustrative, non-exclusive example of an apparatus that includes bushing assemblies according to the present disclosure.

In FIG. 2, an illustrative, non-exclusive example of an apparatus 22 is illustrated in the form of an aircraft 24. The example aircraft 24 is in the form of a fixed wing aircraft; however, other types and configurations of aircraft also are within the scope of the present disclosure, including (but not limited to) helicopters and missiles. Additional non-exclusive examples of apparatuses that may utilize, or include, bushing assemblies 16 include (but are not limited to) spacecraft, land vehicles, marine vehicles, wind turbines, masts, outdoor antennas, any apparatus 22 requiring lightening protection, any apparatus 22 having a component 10 or fastener 14 that penetrates a wall 20 of an object 12, etc.

Aircraft 24 typically include hydraulic systems 26, such as to operate various components of the aircraft 24, including (but not limited to) flaps 28 and other movable portions of the wings 30. Moreover, aircraft 24 typically include one or more fuel tanks 32 within the wings 30 of the aircraft 24. Accordingly, in an effort to efficiently route the various hydraulic lines 34 associated with hydraulic systems 26 within the internal space constraints of the wings 30, the hydraulic lines 34 may penetrate and extend through the fuel tanks 32. Because hydraulic lines 34 typically are constructed of metallic materials and therefore are capable of carrying electrical charges, it may be important to prevent sparking at the interface between the hydraulic lines 34 and the fuel tanks 32. Moreover, because airframes 36 of modern aircraft 24, including the fuel tanks 32 thereof, may be constructed of composite fiber composite materials, the grounding of the hydraulic lines 34 to the fuel tanks 32 may require very tight connections to prevent against sparking. Accordingly, hydraulic lines 34 are illustrative, non-exclusive example of a component 10, and fuel tanks 12 are illustrative, non-exclusive examples of objects 12.

Figure 3:
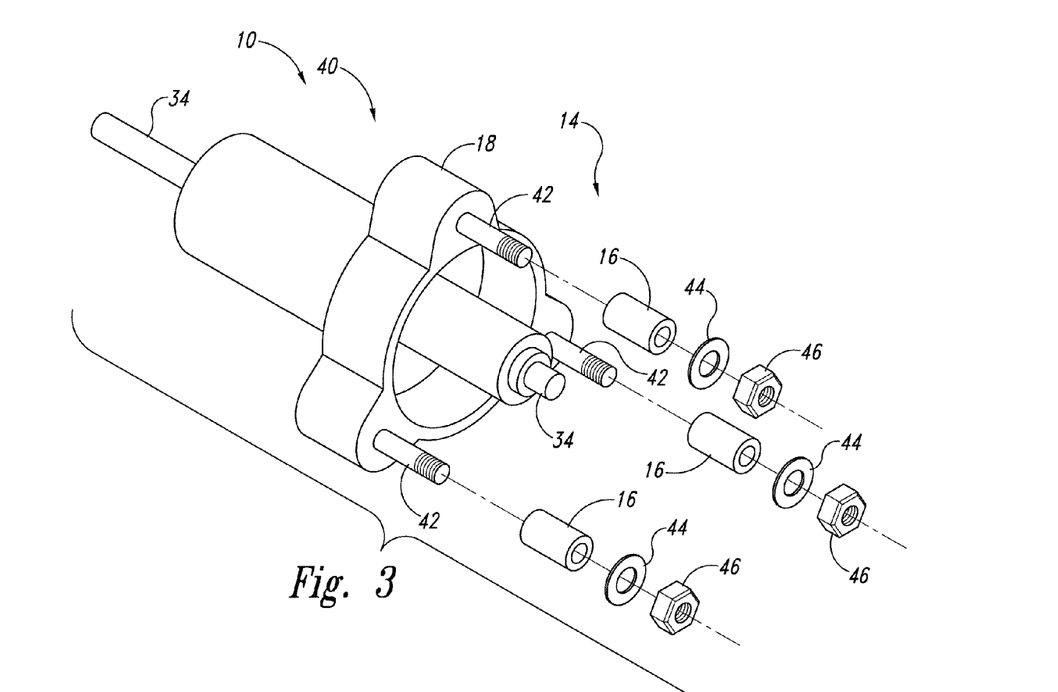
FIG. 3 is an isometric view of a bulkhead isolator for a hydraulic line, representing an illustrative, non-exclusive example of a component that may be installed utilizing bushing assemblies according to the present disclosure, illustrated together with associated fasteners and schematic representations of bushing assemblies according to the present disclosure.

FIG. 3 shows an illustrative, non-exclusive example of a component 10 in the form of a bulkhead isolator 40 for a hydraulic line 34 for mounting to a fuel tank 32 of an aircraft 24, together with associated fasteners 14 and schematic representations of bushing assemblies 16. The bulkhead isolator 40 additionally or alternatively may be described as, or be an example of, a mounting structure 18 for a hydraulic line 34. In the aerospace industry, the term "bulkhead" typically is used to refer to walls that separate "liquid zones" from "dry zones," such as, for example, the walls of a fuel tank 32, but the present disclosure is not limited to utilizing bushing assemblies 16 with bulkhead isolators 40 associated with mounting a hydraulic line 34 to a fuel tank 32. In the illustrated example, the fasteners 14 include studs 42 that are integral with the body of the mounting structure 18, washers 44, and nuts 46; however, other configurations of fasteners 14 are within the scope of the present disclosure, including the use of bolts that extend through mounting structure 18, the use of non-threaded fasteners, etc.

Other applications within aircraft, within the aerospace industry, as well as applications outside of the aerospace industry also are within the scope of the present disclosure, including applications in which the object 12 is not constructed of fiber reinforced composite material, applications in which the component 10 or associated mounting structure 18 is not constructed of a metallic material, and/or applications that do not relate to the prevention of sparking at the interface between a component 10 and an object 12.

Figure 4:
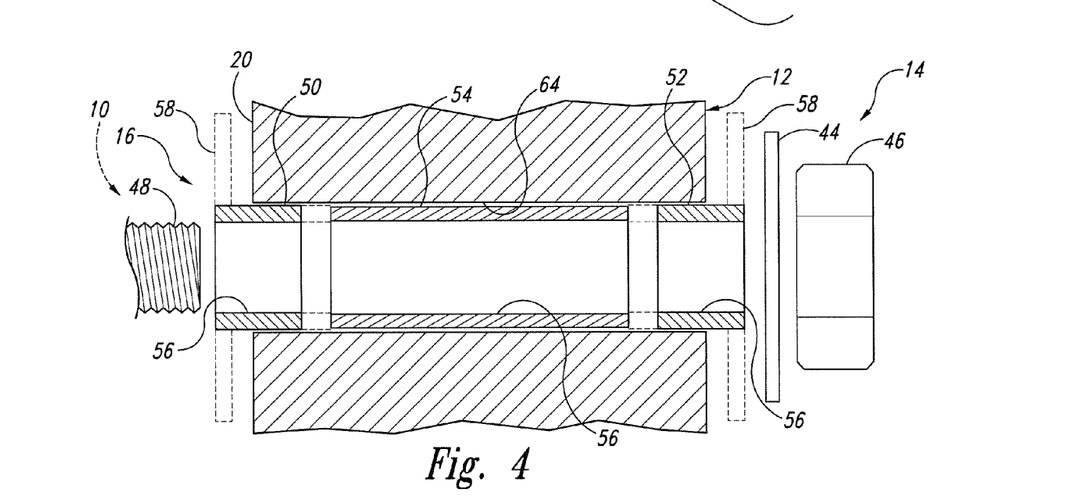
FIG. 4 is a schematic fragmentary partially cross-sectional exploded side view representing bushing assemblies according to the present disclosure, illustrated together with associated fasteners and an object to which a component may be mounted utilizing bushing assemblies according to the present disclosure.
Figure 5:
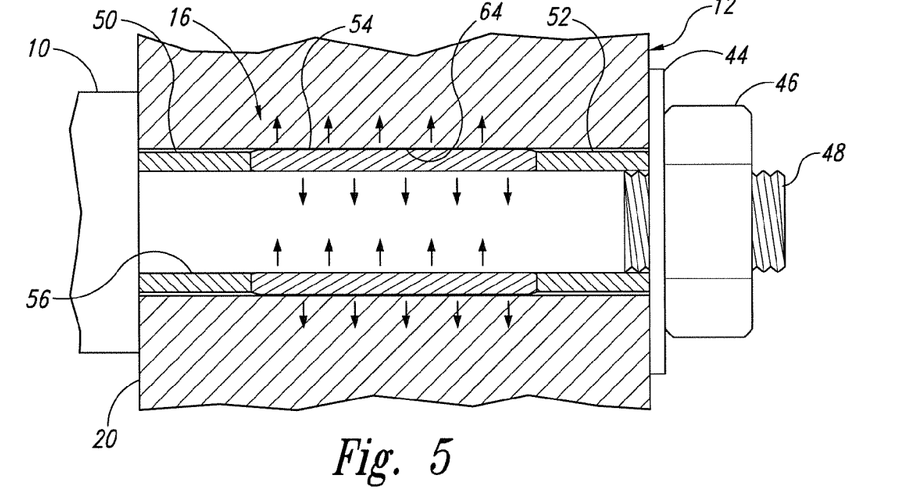
FIG. 5 is a schematic fragmentary partially cross-sectional side view representing bushing assemblies according to the present disclosure in an installed configuration, illustrated together with associated fasteners and an object to which a component may be mounted utilizing bushing assemblies according to the present disclosure.

Turning now to FIGS. 4-5, which somewhat schematically represent illustrative, non-exclusive examples of bushing assemblies 16 together with a component 10, an object 12, and associated fasteners 14, bushing assembly 16 is and object 12 are schematically illustrated in cross-section, and component 10 and the associated fasteners 14 are not illustrated in cross-section. In the illustrated example, fasteners 14 include a washer 44, a nut 46, and a threaded shaft 48. The threaded shaft 48 may be a stud 42 or it may be a separate bolt, and as mentioned, other configurations of fasteners 14 are within the scope of the present disclosure. FIG. 4 schematically illustrates a bushing assembly 16 in an uncompressed configuration, and FIG. 5 schematically illustrates a bushing assembly 16 in a compressed configuration.

As illustrated in FIGS. 4-5, bushing assemblies 16 include a first tubular end portion 50, a second tubular end portion 52, and a middle tubular portion 54, which collectively define a through-bore 56 for receiving a fastener 14, such as in the form of a threaded shaft 48, for mounting a component 10 to an object 12. The middle tubular portion 54 is configured and intended to be selectively positioned between the first tubular end portion 50 and the second tubular end portion 52 within a mounting hole 64 of an object 12. That is, the first tubular end portion 50, the second tubular end portion 52, and the middle tubular portion 54 are sized to be selectively inserted in a mounting hole 64 defined in a wall 20 of an object 12. Typically, although not required, the first tubular end portion 50, the second tubular end portion 52, and the middle tubular portion 54 are cylindrical and have an outer diameter that is at least approximately equal to a diameter of the mounting hole 64 into which the bushing assembly 16 is to be inserted.

In some embodiments, the longitudinal compressive strength of the middle tubular portion 54 is less than the longitudinal compressive strengths of the first tubular end portion 50 and the second tubular end portion 52. Stated differently, the middle tubular portion 54 may be constructed to be less rigid in the longitudinal direction that the first tubular end portion 50 and the second tubular end portion 52. Moreover, the middle tubular portion 54 may be configured to be compressed between the first tubular end portion 50 and the second tubular end portion 52, with the longitudinal length of the middle tubular portion 54 reducing under such longitudinal compression. Accordingly, the combined longitudinal length of the bushing assembly 16 in an uncompressed configuration, such as illustrated in FIG. 4, is intended to be greater than the depth, or length, or the mounting hole 64 with which the bushing assembly 16 is to be utilized. However, when fasteners 14 are used to operatively mount a component 10 to an object 12, the combined longitudinal length of the bushing assembly 16 is reduced, such as schematically illustrated in FIG. 5, due at least in part to the compression of the middle tubular portion 54.

In some embodiments, the longitudinal length of the middle tubular portion 54, when operatively and longitudinally compressed by the first tubular end portion 50 and the second tubular end portion 52, may be greater than the longitudinal length of the first tubular end portion 50. Additionally or alternatively, the longitudinal length of the middle tubular portion 54, when operatively and longitudinally compressed by the first tubular end portion 50 and the second tubular end portion 52, may be greater than the longitudinal length of the second tubular end portion 52. As illustrative, non-exclusive examples, the longitudinal length of the middle tubular portion 54, when compressed, may be at least 50, 60, 70, 80, or 90% of an overall longitudinal length of the bushing assembly when compressed. Such relative lengths, however, are not required in all embodiments of bushing assemblies 16.

Bushing assemblies 16 may be sized for any suitable application. As illustrative, non-exclusive examples, the first tubular end portion 50, the second tubular end portion 52, and the middle tubular portion 54 may have outer diameters in the range of 3-100, 3-50, 3-30, 3-15, 3-10, or 3-5 mm; however, other sizes outside of the enumerated ranges also are within the scope of the present disclosure. Accordingly, bushing assemblies 16 may be configured and intended to be used with and inserted into mounting holes 54 having similar diameters. Additionally or alternatively, the first tubular end portion 50, the second tubular end portion 52, and the middle tubular portion 54 may have a combined longitudinal length, when compressed, in the range of 3-100, 3-50, 3-30, 3-15, 3-10, or 3-5 mm. Other sizes outside of the enumerated ranges also are within the scope of the present disclosure. Illustrative, non-exclusive examples of suitable wall thicknesses of the first tubular end portion 50, the second tubular end portion 52, and the middle tubular portion 54 include thicknesses in the range of 0.1-3 mm; however other thicknesses outside of this range also are within the scope of the present disclosure.

Bushing assemblies 16 may be constructed of any suitable material. In some embodiments, one or more of the first tubular end portion 50, the second tubular end portion 52, and the middle tubular portion 54 may be constructed of electrically conductive material. Additionally or alternatively, one or more of the first tubular end portion 50, the second tubular end portion 52, and the middle tubular portion 54 may be constructed of material that has a conductivity of at least $1 \times 10^6$ Siemens per meter. As illustrative, non-exclusive examples, materials from which one or more of the first tubular end portion 50, the second tubular end portion 52, and the middle tubular portion 54 may be constructed include (but are not limited to) one or more of copper, brass, steel, stainless steel, carbon steel, and aluminum. In some embodiments, one or more of the first tubular end portion 50, the second tubular end portion 52, and the middle tubular portion 54 may be is plated, such as with gold plating, nickel plating, and/or zinc plating. Other materials and constructions of bushing assemblies 16 also are within the scope of the present disclosure.

In some embodiments, such as illustrated in solid lines in FIG. 4, the first tubular end portion 50, the second tubular end portion 52, and the middle tubular portion 54 are not integrally attached to each other. That is, in some embodiments, the first tubular end portion 50, the second tubular end portion 52, and the middle tubular portion 54 are separate and distinct parts that a user may install individually to assemble a bushing assembly 16. However, as schematically represented by the dashed lines connecting first tubular end portion 50 to middle tubular portion 54 and second tubular end portion 52 to middle tubular portion 54, in some embodiments of bushing assemblies 16, the first tubular end portion 50 may be fixedly attached to the middle tubular portion 54 and/or the second tubular end portion 52 may be fixedly attached to the middle tubular portion 54. In such optional examples, the portions may be fused together, such as by welding, brazing, or other means.

As optionally illustrated in FIG. 4 in dashed lines, it is within the scope of the present disclosure that one or both of the first tubular end portion 50 and/or the second tubular end portion 52 may include an optional flange 58 having an outer diameter that is greater than the diameter of the associated mounting hole 64. When present, this optional flange 58 is configured to engage the wall 20 of the object 12, at least when the bushing assembly 16 is installed and fully compressed. In embodiments that include at least one optional flange 58, the combined longitudinal length of the bushing assembly 16 when operatively installed with fasteners 14 in a compressed configuration will be equal to the depth of the corresponding mounting hole 64 plus the thickness of the optional flange or flanges 58. However, in embodiments that do not include optional flanges 58, the combined longitudinal length of the bushing assembly 16 when operatively installed with fasteners 14 in a compressed configuration will be equal to, or at least approximately equal to, the depth of the corresponding mounting hole 64, such as schematically illustrated in FIG. 5.

Figure 6:
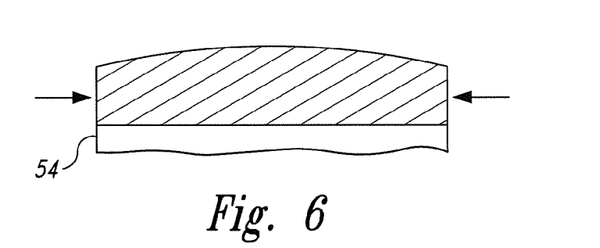
FIG. 6 is a schematic fragmentary cross-sectional side view representing illustrative, non-exclusive examples of middle tubular portions of bushing assemblies according to the present disclosure under a longitudinal compression.
Figure 7:
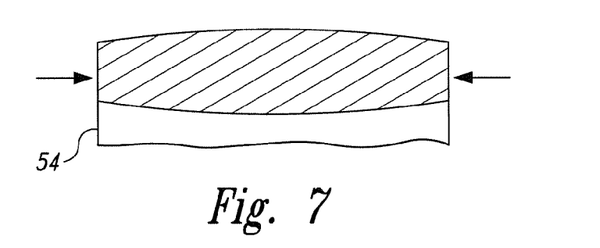
FIG. 7 is a schematic fragmentary cross-sectional side view representing illustrative, non-exclusive examples of middle tubular portions of bushing assemblies according to the present disclosure under a longitudinal compression.
Figure 8:
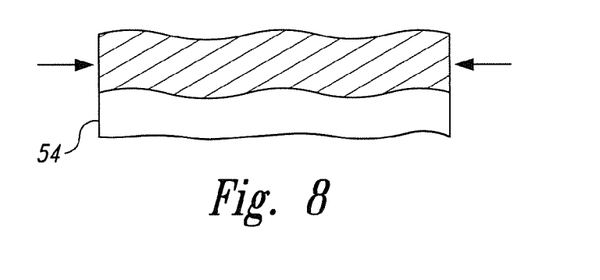
FIG. 8 is a schematic fragmentary cross-sectional side view representing illustrative, non-exclusive examples of middle tubular portions of bushing assemblies according to the present disclosure under a longitudinal compression.
Figure 9:
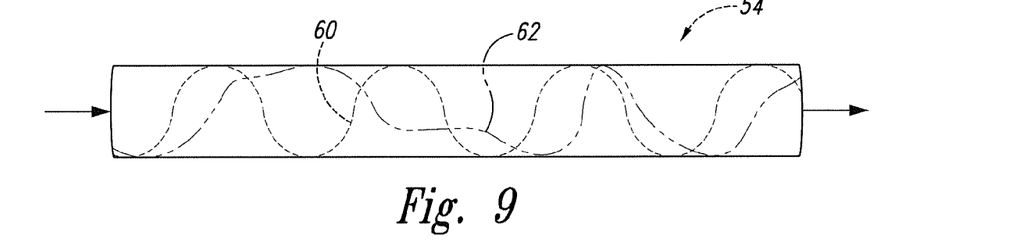
FIG. 9 is a schematic diagram representing an illustrative non-exclusive example of a force profile associated with a longitudinal cross-section of middle tubular portions of bushing assemblies according to the present disclosure under a longitudinal compression.

When a longitudinal force is applied to the middle tubular portion 54 by the first tubular end portion 50 and the second tubular end portion 52, the middle tubular portion 54 may impart inward radial pressure against a fastener 14, such as the threaded shaft 48 of FIGS. 4-5. Additionally or alternatively, when longitudinally compressed, the middle tubular portion 54 may impart outward radial pressure against the wall 20 of the object 12. These radial pressures are schematically illustrated in FIG. 5 with the arrows extending from the middle tubular portion 54. In some embodiments, and depending on the relative sizes between the middle tubular portion 54 and the mounting hole 64 and/or between the middle tubular portion 54 and the associated fastener 14 and on the construction of the middle tubular portion 54, the middle tubular portion 54 may expand radially outward, as schematically illustrated in FIG. 6. Additionally or alternatively, the middle tubular portion 54 may expand radially outward and radially inward, as schematically illustrated in FIG. 7. Additionally or alternatively, the middle tubular portion 54 may generally buckle, or wrinkle, as schematically illustrated in FIG. 8. Stated differently, a longitudinal cross-section of the middle tubular portion 54 may generally define a periodic wave, including a uniform wave, such as a sine wave, or optionally a non-uniform wave. Additionally or alternatively, whether or not the middle tubular portion 54 physically bulges radially inward or radially outward, a longitudinal cross-sectional force profile associated with the middle tubular portion 54 may generally defines a periodic wave, including a uniform wave, such as a sine wave, or optionally a non-uniform wave, as schematically illustrated in FIG. 9. In other words, the middle tubular portion 54, when compressed, may exert pressure both radially outward and radially inward along its longitudinal length, in a uniform manner or a non-uniform manner, depending on such criteria as the construction of the middle tubular portion 54, the interface between the middle tubular portion 54 and a mounting hole 64, and the interface between the middle tubular portion 54 and a fastener 14. In FIG. 9, a force profile 60 in the form of a uniform wave is schematically represented by the dashed line, and a force profile 62 in the form of a non-uniform wave is schematically represented by the dash-dot-dot line.

To accomplish the desired properties of the middle tubular portion, the middle tubular portion may have any suitable construction. As an illustrative, non-exclusive example, the middle tubular portion 54 may have a mesh construction. By "mesh construction," it is meant that the middle tubular portion may not be solid across its thickness and/or along its longitudinal length and/or around its circumference. For example, the middle tubular portion 54 may have a braided or woven construction. Braided sleeving is an illustrative, non-exclusive example of a suitable construction for embodiments of middle tubular portions 54. In some such examples, the braded sleeving may be described as off-the-shelf braided sleeving, such as is available and marketed for use in various industries and for various applications. For example, braided sleeving often is used to cover and protect rubber hoses in automotive applications. Additionally, braided sleeving is often used as a grounding solution in electrical applications. Accordingly, a length of braided sleeving may be cut to create a middle tubular portion 54 of a bushing assembly 16.

In some embodiments, although not required, the middle tubular portion 54 may be impregnated with a resin. Stated differently, in some embodiments, the middle tubular portion 54 may include a resin matrix. For example, such a construction may be desirable when the object 12, to which a component 10 is to be mounted utilizing a bushing assembly 16, is constructed of fiber reinforced composite material. In such situations, the compression of the middle tubular portion 54 and the radially outward pressure exerted by the middle tubular portion 54 to the mounting hole 64 may provide a desired interface between the middle tubular portion 54 and the object 20, such as to ensure a electrical current pathway from the component 10 to the object 12 without the risk of sparking.

Figure 10:
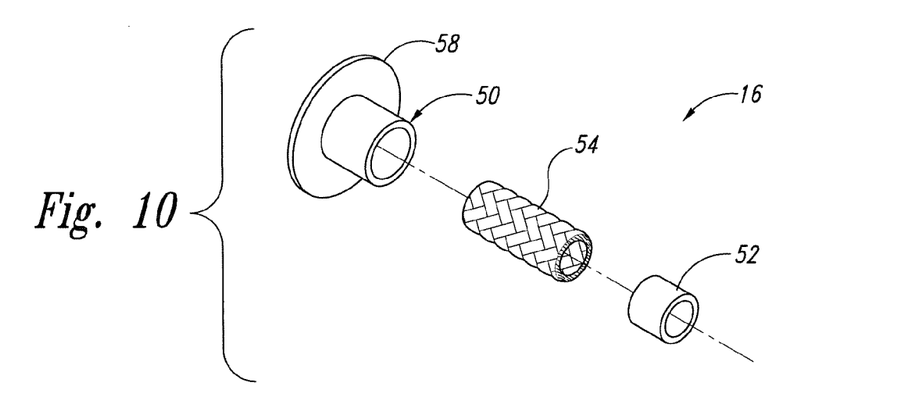
FIG. 10 is an isometric exploded view of an illustrative, non-exclusive example of a bushing assembly according to the present disclosure.

Turning now to FIG. 10, an illustrative, non-exclusive examples of a busing assembly 16 is illustrated. In this non-exclusive example, the first end portion 50 includes an optional flange 58, and the middle tubular portion 54 is constructed of braided sleeving. As discussed herein, however, other configurations of bushing assemblies 16 are within the scope of the present disclosure, and FIG. 10 is not limiting.

Figure 11:
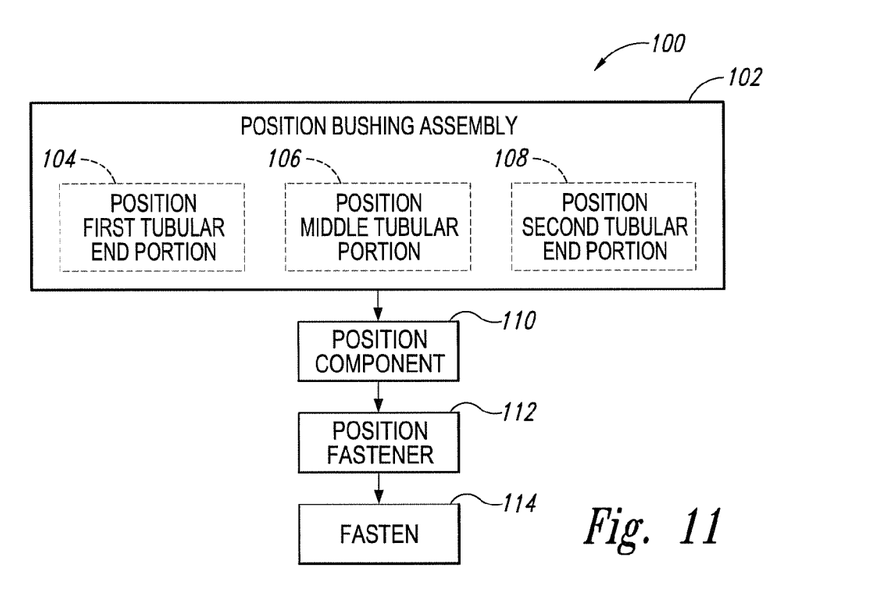
FIG. 11 is a flowchart schematically representing illustrative, non-exclusive examples of methods of utilizing bushing assemblies according to the present disclosure.

FIG. 11 schematically provides a flowchart that represents illustrative, non-exclusive examples of methods 100 according to the present disclosure. In FIG. 11, some steps are illustrated in dashed boxes indicating that such steps may be optional or may correspond to an optional version of a method 100 according to the present disclosure. That said, not all methods according to the present disclosure are required to include the steps illustrated in solid boxes. The methods and steps illustrated in FIG. 11 are not limiting and other methods and steps are within the scope of the present disclosure, including methods having greater than or fewer than the number of steps illustrated, as understood from the discussions herein.

Methods 100 may additionally or alternatively be described as methods of utilizing a bushing assembly 16. As schematically illustrated in FIG. 11, methods 100 typically include positioning the bushing assembly 16 in a mounting hole 64 of an object 12 to which a component 10 is to be mounted, as schematically indicated at 102. In embodiments of bushing assemblies, in which the first tubular end portion 50, the second tubular end portion 52, and the middle tubular portion 54 are integral to each other, a single positioning step 102 may be utilized. However, as discussed herein, some embodiments of bushing assemblies 16 do not include integral component parts. Accordingly, in some methods 100, depending on the configuration of the bushing assembly 16, the positioning 102 may include one or more of positioning the first tubular end portion 50, as schematically indicated at 104, positioning the middle tubular portion 54, as schematically indicated at 106, and positioning the second tubular end portion 52, as schematically indicated at 108.

Methods 100 also typically include positioning the component 10 relative to the object 12 to which the component 10 is to be mounted, as schematically indicated at 110, positioning a fastener 14 through the mounting hole 64 and the through-bore 56 of the bushing assembly 16, as schematically indicated at 112, and fastening the component 10 to the object 12, as schematically indicated at 114.

In some methods 100, the fastening 114 includes longitudinally compressing the middle tubular portion 54 of the bushing assembly 16. In some methods 100, prior to the fastening 114, the bushing assembly 16 has a longitudinal length that is greater than a length of the mounting hole 64, and following the fastening, the length of the bushing assembly 16 is equal to, or is approximately equal to, the length of the mounting hole 64.

In some methods 100, such as depending on the construction of the bushing assembly 16 and/or on the interface between the bushing assembly 16 and the mounting hole 64, the fastening 114 may include radially expanding outwardly the middle tubular portion 54 into operative engagement with the mounting hole 64 of the object 12. In some methods 100, the fastening 114 may include radially expanding inwardly the middle tubular portion 54 into operative engagement with the fastener 14. In some methods 100, the fastening 114 may include buckling, or wrinkling, the middle tubular portion 54.

In some methods 100, following the fastening 114, the fastener 14 may be grounded electrically to the object 12 through the bushing assembly 16. In some methods 100, following the fastening 114, the component 10 is grounded electrically to the object 12 through the fastener 14 and the bushing assembly 16.

In some methods 100, following the fastening 114, the interface between the bushing assembly 16 and the fastener 14 and the interface between the bushing assembly 16 and the object 10 are configured to prevent sparking between the fastener 14, the bushing assembly 16, and the object 10 when the fastener 14 carries an electrical charge.

In some methods 100, following the fastening 114, the interface between the middle tubular portion 54 and the fastener 14 and the interface between the tubular middle portion 54 and the object 12 may be substantially free of voids.

As discussed, bushing assemblies may be used in a variety of applications. As an illustrative, non-exclusive example, in methods 100, the object 10 may include a tank for holding liquid, such as a fuel tank, including a fuel tank 32 of an aircraft 24. In some methods 100, the object 12 may be constructed of fiber reinforced composite material. In some methods 100, the component 10 may be configured to carry an electrical charge and the bushing assembly 16 may be configured to ground the component 10 to the object 12. In some methods 100, the component 10 may include a bulkhead isolator 40 for a hydraulic line 34.

Illustrative, non-exclusive examples of inventive subject matter according to the present disclosure are described in the following enumerated paragraphs:

A. A bushing assembly, comprising:
a first tubular end portion having a first longitudinal compressive strength;
a second tubular end portion having a second longitudinal compressive strength; and
a middle tubular portion positioned between and engaged with the first tubular end portion and the second tubular end portion, wherein the middle tubular portion has a third longitudinal compressive strength that is less than the first longitudinal compressive strength and the second longitudinal compressive strength, and wherein when a compressive force is applied to the middle tubular portion by the first tubular end portion and the second tubular end portion, the middle tubular portion longitudinally compresses;
wherein the first tubular end portion, the second tubular end portion, and the middle tubular portion collectively define a through-bore for receiving a fastener for mounting a component to an object.

A1. A bushing assembly, comprising:
a first tubular end portion;
a second tubular end portion; and
a middle tubular portion positioned between and engaged with the first tubular end portion and the second tubular end portion, wherein the middle tubular portion includes a sleeve of braided or woven strands;
wherein the first tubular end portion, the second tubular end portion, and the middle tubular portion collectively define a through-bore for receiving a fastener for mounting a component to an object.

A2. The bushing assembly of any of paragraphs A-A1, wherein the first tubular end portion, the second tubular end portion, and the middle tubular portion are not integrally attached to each other.

A3. The bushing assembly of any of paragraphs A-A1, wherein the first tubular end portion is fixedly attached to the middle tubular portion and/or the second tubular end portion is fixedly attached to the middle tubular portion.

A3.1 The bushing assembly of paragraph A3, wherein the first tubular end portion is fused, and optionally welded, to the middle tubular portion and/or the second tubular end portion is fused, and optionally welded, to the middle tubular portion.

A4. The bushing assembly of any of paragraphs A-A3.1, wherein the first tubular end portion includes a first flange extending radially away from the through-bore, and wherein the first flange is configured to engage the object when the bushing assembly is utilized for mounting the component to the object.

A4.1 The bushing assembly of paragraph A4, wherein the second tubular end portion includes a second flange extending radially away from the through-bore, wherein the second flange is configured to engage the object when the bushing assembly is utilized for mounting the component to the object.

A5. The bushing assembly of any of paragraphs A-A4.1, wherein a longitudinal length of the middle tubular portion, when longitudinally compressed, is greater than a longitudinal length of the first tubular end portion.

A5.1 The bushing assembly of paragraph A5, wherein the longitudinal length of the middle tubular portion, when compressed, is greater than a longitudinal length of the second tubular end portion.

A6. The bushing assembly of any of paragraphs A-A5.1, wherein a longitudinal length of the middle tubular portion, when compressed, is at least 50, 60, 70, 80, or 90% of an overall longitudinal length of the bushing assembly, when compressed.

A7. The bushing assembly of any of paragraphs A-A6, wherein the first tubular end portion, the second tubular end portion, and the middle tubular portion have an outer diameter in the range of 3-100, 3-50, 3-30, 3-15, 3-10, or 3-5 mm.

A8. The bushing assembly of any of paragraphs A-A7, wherein the first tubular end portion, the second tubular end portion, and the middle tubular portion have a collective length in the range of 3-100, 3-50, 3-30, 3-15, 3-10, or 3-5 mm, when the middle tubular portion is compressed.

A9. The bushing assembly of any of paragraphs A-A8, wherein the first tubular end portion, the second tubular end portion, and the middle tubular portion are constructed of electrically conductive material.

A10. The bushing assembly of any of paragraphs A-A9, wherein the first tubular end portion, the second tubular end portion, and the middle tubular portion are constructed of material that has a conductivity of at least $1 \times 10^6$ Siemens per meter.

A11. The bushing assembly of any of paragraphs A-A10, wherein the first tubular end portion, the second tubular end portion, and the middle tubular portion are constructed of one or more of copper, brass, steel, stainless steel, carbon steel, and aluminum.

A12. The bushing assembly of any of paragraphs A-A11, wherein when a longitudinal compressive force is applied to the middle tubular portion by the first tubular end portion and the second tubular end portion, the middle tubular portion expands radially outward.

A13. The bushing assembly of any of paragraphs A-A12, wherein when a longitudinal compressive force is applied to the middle tubular portion by the first tubular end portion and the second tubular end portion, the middle tubular portion expands radially inward and radially outward.

A14. The bushing assembly of any of paragraphs A-A13, wherein when a longitudinal compressive force is applied to the middle tubular portion by the first tubular end portion and the second tubular end portion, the middle tubular portion buckles, or wrinkles.

A15. The bushing assembly of any of paragraphs A-A14, wherein when a longitudinal compressive force is applied to the middle tubular portion by the first tubular end portion and the second tubular end portion, a longitudinal cross-section of the middle tubular portion generally defines a periodic wave, and optionally a uniform wave, optionally a sine wave, and optionally a non-uniform wave.

A16. The bushing assembly of any of paragraphs A-A15, wherein when a longitudinal compressive force is applied to the middle tubular portion by the first tubular end portion and the second tubular end portion, and when the middle tubular portion is inwardly bound by the fastener and is outwardly bound by the object, a longitudinal cross-sectional force profile associated with the middle tubular portion generally defines a periodic wave, and optionally a uniform wave, optionally a sine wave, and optionally a non-uniform wave.

A17. The bushing assembly of any of paragraphs A-A16, wherein the middle tubular portion has a mesh construction.

A18. The bushing assembly of any of paragraphs A-A17, wherein the middle tubular portion has a braided or woven construction.

A19. The bushing assembly of any of paragraphs A-A18, wherein the middle tubular portion comprises a length of braided sleeving.

A19.1 The bushing assembly of paragraph A19, wherein the braided sleeving includes stainless steel braided sleeving.

A20. The bushing assembly of any of paragraphs A-A19.1, wherein the middle tubular portion is impregnated with a resin.

A21. The bushing assembly of any of paragraphs A-A20, wherein the middle tubular portion includes a resin matrix.

A22. The bushing assembly of any of paragraphs A-A21, wherein when no longitudinal compressive force is applied to the middle tubular portion by the first tubular end portion and the second tubular end portion, the bushing assembly has an uncompressed length; and wherein when a longitudinal compressive force is applied to the middle tubular portion by the first tubular end portion and the second tubular end portion, the bushing assembly has a compressed length that is less than the uncompressed length.

A22.1 The bushing assembly of paragraph A22, wherein the longitudinal compressive force is an installation force associated with fastening the component to the object.

A23. The bushing assembly of any of paragraphs A-A22.1 in combination with the component, the object, and the fastener;

wherein the bushing assembly is positioned within a mounting hole defined by the object;

wherein the fastener extends through the through-bore of the bushing assembly; and wherein the component is operatively fastened to the object.

A23.1 The combination of paragraph A23, wherein the object includes a tank for holding liquid, optionally a fuel tank, and optionally a fuel tank of an aircraft.

A23.2 The combination of any of paragraphs A23-A23.1, wherein the object is constructed of fiber reinforced composite material.

A23.3 The combination of any of paragraphs A23-A23.2, wherein the component is configured to carry an electrical charge, and wherein the bushing assembly provides an electric current flow path between the component and the object.

A23.4 The combination of any of paragraphs A23-A23.3, wherein the component includes a hydraulic line, and optionally a bulkhead isolator for a hydraulic line.

A23.5 The combination of any of paragraphs A23-A23.4, wherein the tubular middle portion is compressed longitudinally.

A23.6 The combination of any of paragraphs A23-A23.5, wherein a longitudinal cross-sectional force profile associated with the middle tubular portion generally defines a periodic wave, and optionally a uniform wave, optionally a sine wave, and optionally a non-uniform wave.

A23.7 The combination of any of paragraphs A23-A23.6, wherein interface between the tubular middle portion and the fastener and the interface between the tubular middle portion and the object are substantially free of voids.

A23.8 An aircraft including the combination of any of paragraphs A23-A23.7.

B. A method, comprising:
positioning the bushing assembly of any of paragraphs A-A22.1 in a mounting hole of an object to which a component is to be mounted;
positioning the component relative to the object to which the component is to be mounted;
positioning a fastener through the mounting hole and the through-bore of the bushing assembly; and
fastening the component to the object.

B1. The method of paragraph B, wherein the fastening includes longitudinally compressing the middle tubular portion of the bushing assembly.

B1.1 The method of paragraph B2, wherein prior to the fastening, the bushing assembly has a length that is greater than a length of the mounting hole.

The method of paragraph B1.1, wherein following the fastening, the length of the bushing assembly is equal to, or is approximately equal to, the length of the mounting hole.

B2. The method of any of paragraphs B-B1.1.1, wherein the fastening includes radially expanding outwardly the middle tubular portion into operative engagement with the mounting hole of the object.

B3. The method of any of paragraphs B-B2, wherein the fastening includes radially expanding inwardly the middle tubular portion into operative engagement with the fastener.

B4. The method of any of paragraphs B-B3, wherein the fastening includes buckling, or wrinkling, the middle tubular portion.

B5. The method of any of paragraphs B-B4, wherein following the fastening, the fastener is grounded electrically to the object through the bushing assembly.

B6. The method of any of paragraphs B-B5, wherein following the fastening, the component is grounded electrically to the object through the fastener and the bushing assembly.

B7. The method of any of paragraphs B-B6, wherein following the fastening, the interface between the bushing assembly and the fastener and the interface between the bushing assembly and the object are configured to prevent sparking between the fastener, the bushing assembly, and the object when the fastener carries an electrical charge.

B8. The method of any of paragraphs B-B7, wherein following the fastening, the interface between the tubular middle portion and the fastener and the interface between the tubular middle portion and the object are substantially free of voids.

B9. The method of any of paragraphs B-B8, wherein the object includes a tank for holding liquid, optionally a fuel tank, and optionally a fuel tank of an aircraft.

B10. The method of any of paragraphs B-B9, wherein the object is constructed of fiber reinforced composite material.

B11. The method of any of paragraphs B-B10, wherein the component is configured to carry an electrical charge, and wherein the bushing assembly is configured to ground the component to the object.

B12. The method of any of paragraphs B-B11, wherein the component includes a bulkhead isolator for a hydraulic line.

B13. The method of any of paragraphs B-B12, wherein the component and object are associated with an aircraft.

C. A bushing assembly kit, comprising:
a first tubular end portion having a first longitudinal compressive strength;
a second tubular end portion having a second longitudinal compressive strength; and
a middle tubular portion for being positioned between and engaged with the first tubular end portion and the second tubular end portion, wherein the middle tubular portion has a third longitudinal compressive strength that is less than the first longitudinal compressive strength and the second longitudinal compressive strength;
wherein the first tubular end portion, the second tubular end portion, and the middle tubular portion are for collectively defining a bushing assembly for receiving a fastener for mounting a component to an object; and
wherein when the bushing assembly is defined and when a compressive force is applied to the middle tubular portion by the first tubular end portion and the second tubular end portion, the middle tubular portion longitudinally compresses.

C1. The bushing assembly kit of paragraph C, further comprising the subject matter of any of paragraphs A-A22.8.

As used herein, a "fiber reinforced composite material" should be understood to include at least an epoxy or other polymer or binding material together with fibers, such as (but not limited to) carbon fibers, boron fibers, para-aramid (e.g., Kevlar®) fibers, and/or other fibers. Fiber reinforced composite materials additionally or alternatively may be described as or referred to as fiber reinforced polymers, or plastics.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A bushing assembly, comprising:
a first tubular end portion having a first longitudinal compressive strength;
a second tubular end portion having a second longitudinal compressive strength; and
a middle tubular portion positioned between and engaged with the first tubular end portion and the second tubular end portion, wherein the middle tubular portion has a third longitudinal compressive strength that is less than the first longitudinal compressive strength and the second longitudinal compressive strength, and wherein when a compressive force is applied to the middle tubular portion by the first tubular end portion and the second tubular end portion, the middle tubular portion longitudinally compresses;
wherein the first tubular end portion, the second tubular end portion, and the middle tubular portion collectively define a through-bore for receiving a fastener for mounting a component to an object; and
wherein the first tubular end portion, the second tubular end portion, and the middle tubular portion are constructed of electrically conductive material.

2. The bushing assembly of claim 1, wherein the first tubular end portion, the second tubular end portion, and the middle tubular portion are not integrally attached to each other.

3. The bushing assembly of claim 1, wherein the first tubular end portion includes a first flange extending radially away from the through-bore, and wherein the first flange is configured to engage the object when the bushing assembly is utilized for mounting the component to the object.

4. The bushing assembly of claim 1, wherein a longitudinal length of the middle tubular portion, when compressed, is at least 50% of an overall longitudinal length of the bushing assembly.

5. The bushing assembly of claim 1, wherein the first tubular end portion, the second tubular end portion, and the middle tubular portion have an outer diameter in a range of 3-100 mm.

6. The bushing assembly of claim 1, wherein the first tubular end portion, the second tubular end portion, and the middle tubular portion have a collective length in a range of 3-100 mm, when the middle tubular portion is compressed.

7. The bushing assembly of claim 1, wherein when a longitudinal compressive force is applied to the middle tubular portion by the first tubular end portion and the second tubular end portion, the middle tubular portion expands radially outward.

8. The bushing assembly of claim 1, wherein when a longitudinal compressive force is applied to the middle tubular portion by the first tubular end portion and the second tubular end portion, the middle tubular portion expands radially inward and radially outward.

9. The bushing assembly of claim 1, wherein when a longitudinal compressive force is applied to the middle tubular portion by the first tubular end portion and the second tubular end portion, the middle tubular portion buckles.

10. The bushing assembly of claim 1, wherein when a longitudinal compressive force is applied to the middle tubular portion by the first tubular end portion and the second tubular end portion, and when the middle tubular portion is inwardly bound by the fastener and is outwardly bound by the object, a longitudinal cross-sectional force profile associated with the middle tubular portion generally defines a periodic wave.

11. The bushing assembly of claim 1, wherein the middle tubular portion has a mesh construction.

12. The bushing assembly of claim 1, wherein the middle tubular portion comprises a length of metallic braided sleeving.

13. The bushing assembly of claim 12, wherein the middle tubular portion is impregnated with a resin.

14. The bushing assembly of claim 1, wherein when a longitudinal compressive force in the form of an installation force associated with fastening the component to the object is applied to the middle tubular portion by the first tubular end portion and the second tubular end portion, the bushing assembly has a compressed length that is less than an uncompressed length.

15. The bushing assembly of claim 1 in combination with the component, the object, and the fastener;
    wherein the bushing assembly is positioned within a mounting hole that extends completely through a wall of the object;
    wherein the fastener extends through the through-bore of the bushing assembly and completely through the mounting hole;
    wherein the component is operatively fastened to the object; and
    wherein the middle tubular portion is compressed longitudinally between the first tubular end portion and the second tubular end portion.

16. The combination of claim 15, wherein the object includes a fuel tank of an aircraft, wherein the fuel tank is constructed of fiber reinforced composite material, wherein the component includes a hydraulic line, wherein the hydraulic line is configured to carry an electrical charge, and wherein the bushing assembly provides an electric current flow path between the hydraulic line and the fuel tank.

17. A method, comprising:
    positioning the bushing assembly of claim 1 in a mounting hole that extends completely through a wall of an object to which a component is to be mounted;
    positioning the component relative to the object to which the component is to be mounted;
    positioning a fastener completely through the mounting hole and the through-bore of the bushing assembly; and
    fastening the component to the object.

18. A bushing assembly, comprising:
    a first tubular end portion;
    a second tubular end portion; and
    a middle tubular portion positioned between and engaged with the first tubular end portion and the second tubular end portion, wherein the middle tubular portion includes a sleeve of woven strands;
    wherein the first tubular end portion, the second tubular end portion, and the middle tubular portion collectively define a through-bore for receiving a fastener for mounting a component to an object.

19. A bushing assembly kit, comprising:
    a first tubular end portion having a first longitudinal compressive strength;
    a second tubular end portion having a second longitudinal compressive strength; and
    a middle tubular portion for being positioned between and engaged with the first tubular end portion and the second tubular end portion, wherein the middle tubular portion has a third longitudinal compressive strength that is less than the first longitudinal compressive strength and the second longitudinal compressive strength;
    wherein the first tubular end portion, the second tubular end portion, and the middle tubular portion are for collectively defining a bushing assembly for receiving a fastener for mounting a component to an object, and wherein the first tubular end portion, the second tubular end portion, and the middle tubular portion are constructed of electrically conductive material; and
    wherein when the bushing assembly is defined and when a compressive force is applied to the middle tubular portion by the first tubular end portion and the second tubular end portion, the middle tubular portion longitudinally compresses.

20. The kit of claim 19, wherein the middle tubular portion includes a sleeve of woven strands.

* * * * *